United States Patent [19]

Arents

[11] 4,236,212
[45] Nov. 25, 1980

[54] HELICOPTER PERFORMANCE CALCULATOR

[75] Inventor: Donald N. Arents, Newport News, Va.

[73] Assignee: The United States of America as represented by the Secretary of the Army, Alexandria, Va.

[21] Appl. No.: 12,418

[22] Filed: Feb. 15, 1979

[51] Int. Cl.³ .................. G06F 9/06; B64C 19/00
[52] U.S. Cl. ........................ 364/424; 364/427; 364/428; 364/431; 364/432
[58] Field of Search ............... 364/424, 427, 428, 431, 364/432; 60/39.16 R; 244/6, 26

[56] References Cited

U.S. PATENT DOCUMENTS

| | | | |
|---|---|---|---|
| 3,761,693 | 9/1973 | Fleury | 364/424 X |
| 3,906,437 | 9/1975 | Brandwein et al. | 364/424 X |
| 3,927,306 | 12/1975 | Miller | 364/427 |
| 3,963,372 | 6/1976 | McLain et al. | 364/431 X |
| 3,969,890 | 7/1976 | Nelson | 364/431 X |
| 4,134,258 | 1/1979 | Hobo et al. | 60/39.16 R X |

*Primary Examiner*—Edward J. Wise
*Attorney, Agent, or Firm*—Nathan Edelberg; Robert P. Gibson; Norman L. Wilson, Jr.

[57] ABSTRACT

A specialized electronic calculator for providing to helicopter pilots an immediate computation and readout of the helicopter's hover performance capability. The invention provides helicopter pilots with the power available and the maximum gross weight which the helicopter is able to hover simply by keying into the calculator the outside air temperature and the pressure altitude.

5 Claims, 4 Drawing Figures

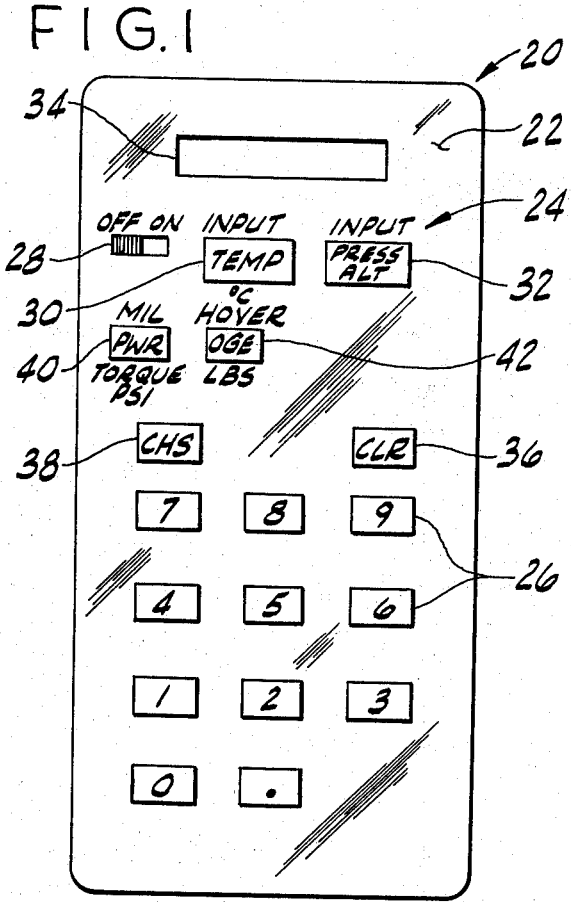
FIG. 1
FIG. 4
AH-1G HOVER PERFORMANCE INSTRUCTIONS
1. ENTER O.A.T. (°C) ON DIGITAL KEYBOARD.
2. PRESS "TEMP" KEY.
3. ENTER PRESSURE ALTITUDE (FT) ON DIGITAL KEYBOARD.
4. PRESS "PRESS. ALT." KEY.
5. PRESS "PWR" KEY AND READ 'SPEC' TORQUE AVAILABLE ON DISPLAY.
6. PRESS "OGE" KEY AND READ GROSS WEIGHT TO HOVER OUT OF GROUND EFFECT.
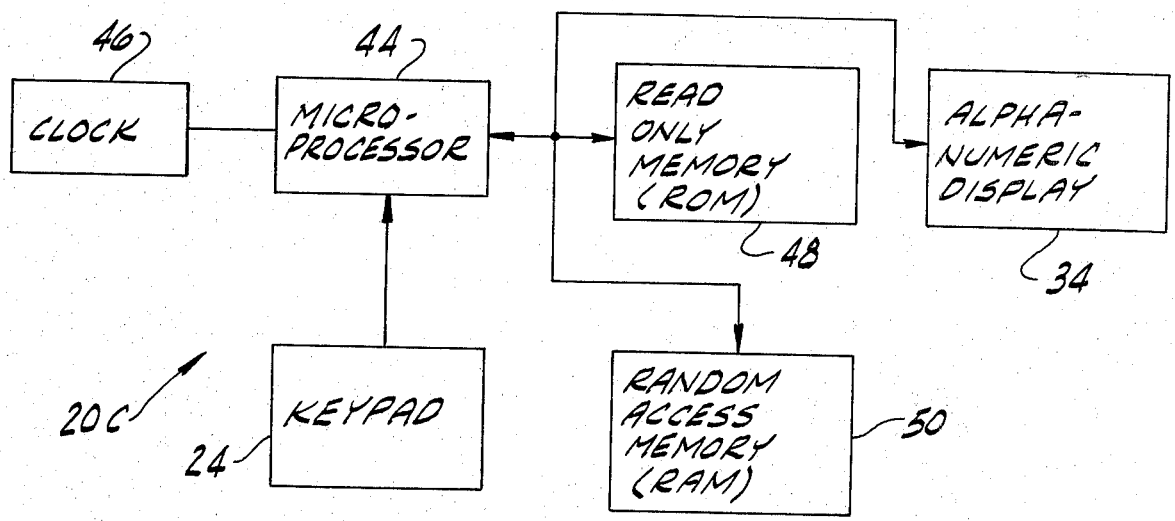
FIG. 2

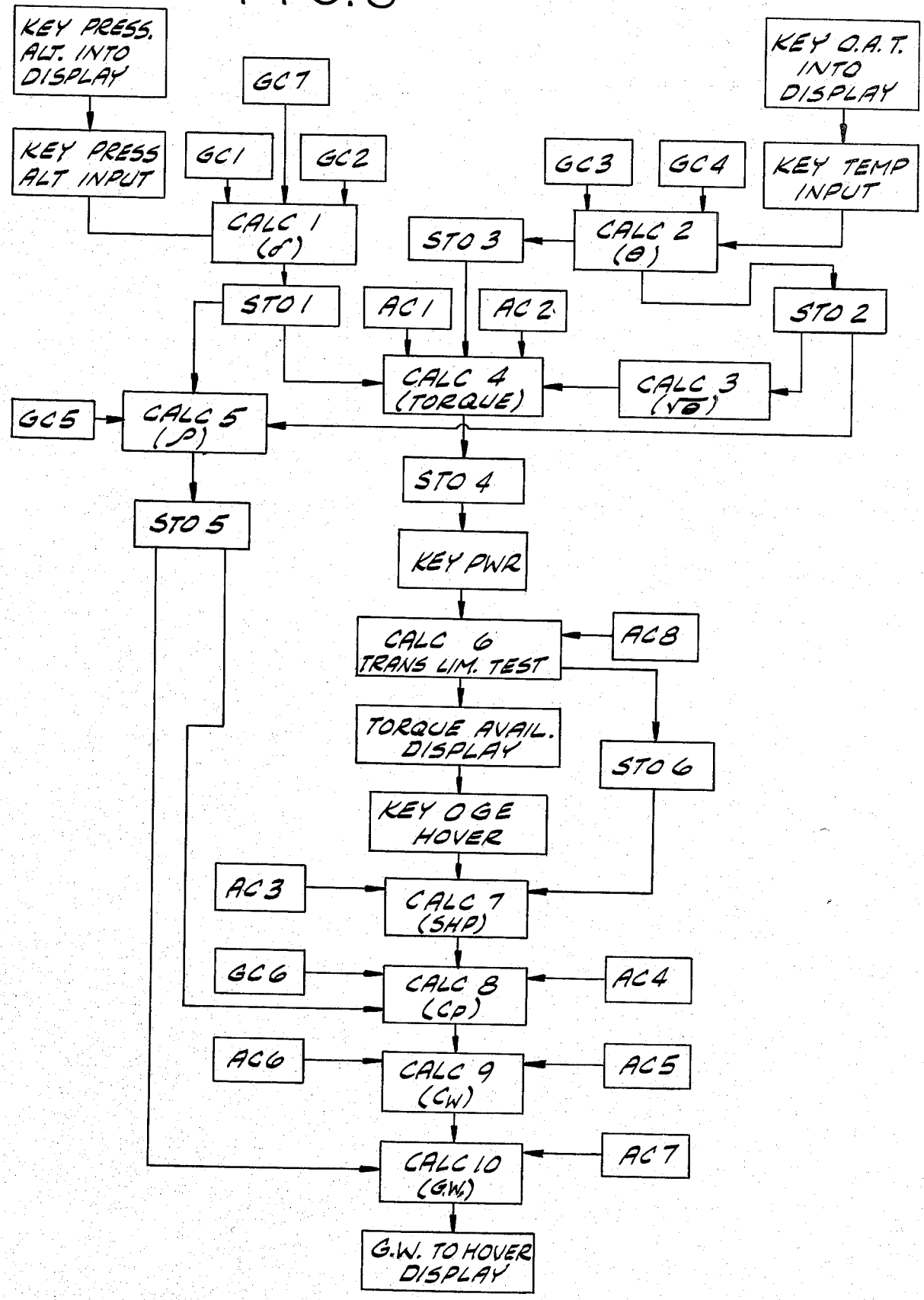

HELICOPTER PERFORMANCE CALCULATOR

BACKGROUND AND SUMMARY OF THE INVENTION

The present invention relates to calculators and more particularly to a calculator for quickly providing the helicopter hover performance capability of a particular helicopter.

One of the most important characteristics of a helicopter is its hover performance capability (the maximum gross weight at which hovering is possible), and it is unquestionably good practice for a pilot to calculate such capability while planning a flight to insure that the particular helicopter chosen is suitable for the mission and load required to be transported. Helicopters typically include instrumentation providing readouts of outside air temperature and outside pressure at the altitude of the aircraft (pressure altitude) which variables are necessary for calculation of the hover performance capability. In the situation where, during flight planning, the aircraft appears to be marginally suitable for its intended mission, the hover performance capability should be recalculated shortly prior to the portion of the flight during which hovering is necessary or desired.

Heretofore, assessment of the aircraft's power and the gross weight at which it could hover has been a cumbersome, time-consuming effort as it required reference to various charts or graphs in the helicopter operator's manual supplied with the aircraft. For example, to determine the military rating torque available for the AH-1G military helicopter, the pilot has been required to enter the pressure altitude scale of the military power available chart, move horizontally to the intersection of the temperature line (interpolating as necessary), and then project vertically to the torquemeter (torque pressure) scale. For aircraft manuals in which a torquemeter scale is not available on the power available chart, the pilot must also convert the power available into terms of torque. The next step in determining the maximum gross weight at which hovering is possible for the specific pressure altitude, temperature, and military power has been to enter the appropriate hover ceiling chart with pressure altitude, move horizontally to the intersection of the temperature line (again interpolating as necessary) and project vertically to the gross weight scale. In a tactical or emergency situation there might be insufficient time for the several references to the operator's manual causing the pilot to rely solely on judgment and past experience. It will be appreciated also that such manual graphic computation methods may render less than the desired accuracy.

Although the electronic calculator art has undergone rapid advancement, such calculators are typically either of the four function type particularily suited for personal use, or of the relatively sophisticated and expensive scientific type designed for calculations requiring advanced mathemathics. The four function calculator is not well suited for calculations of hover performance capability since the calculations require the use of certain constants which relate only to a particular airframe/engine combination thus requiring individual entry of these many constants.

The improved electronic calculator of the present invention is specifically adapted to provide a computation and readout of a helicopter's military power available and the gross weight the helicopter is capable of hovering, immediately upon entering into the calculator only the outside air temperature and the pressure altitude. The calculator is provided with a read only memory into which all of the general constants, specific aircraft constants and necessary calculations are preprogrammed and stored. The calculator also includes a microprocessor or processing means for performing the necessary calculations and for transfering information to a random access memory. A keyboard or input means provides the means for entering the outside air temperature and pressure altitude into the microprocessor and subsequently into the random access memory. The keyboard also is constructed to direct the calculator to commence calculating and to display the military power rating and the maximum gross hover weight on a display means. A clock in the calculator controls the sequence of events in the microprocessor.

It is therefore the main object of the invention to provide an inexpensive electronic calculator which is capable of immediately and accurately calculating and displaying the military power rating and the maximum gross hover weight of a particular helicopter with only the parameters of the outside air temperature and the pressure altitude being keyed into the calculator.

BRIEF DESCRIPTION OF THE DRAWINGS

Other objects and advantages will become more apparent from a reading of the following description of a preferred embodiment of the invention along with reference to the accompanying drawings wherein:

FIG. 1 is a plan of the electronic calculator of the present invention showing the various switches, input keys, output keys and display means of the calculator;

FIG. 2 is a block diagram illustrating the major electronic components of the calculator;

FIG. 3 is a computer flow diagram disclosing the various inputs and steps required in computing the maximum helicopter hover weight which are performed by the invention; and FIG. 4 is an instruction placard for the calculator of the present invention, which placard can conveniently be mounted on the back of the calculator or in the helicopter cockpit.

Corresponding reference numerals indicate corresponding components throughout the several views of the drawings.

DESCRIPTION OF THE PREFERRED EMBODIMENT

Referring now to FIG. 1, an electronic calculator of the present invention is generally indicated by reference numeral 20. Calculator 20 comprises a face-plate 22 including a keyboard 24. Although face-plate 22 would typically be a component of a housing for enclosure of the calculator, such a housing is well known in the art and is not shown.

Keyboard 24 comprises a series of switches or keys 26 for permitting the operator to introduce information to the electronic components of the calculator. As will be explained more fully hereinafter, the only information required by the calculator to compute the maximum gross weight which the helicopter is able to hover are readings of the outside air temperature and the pressure altitude. The keys 26 include ten numeric keys labelled 1-9 and 0 and a decimal point key. The keyboard further comprises an on/off switch 28 for selectively connecting the various electronic components of the calculator to a source of power, preferably a battery (not shown) included within the housing.

Included within face-plate 22 is a display means or readout 34 which includes a series of individual display modules each preferably formed of a plurality of light-emitting diodes of well known construction.

Keyboard 24 also includes input keys 30 and 32 which, respectively, function to enter the outside air temperature and the pressure altitude after such readings are shown on display means 34 as a result of operator actuation of keys 26. If the operator made an error in operation of keys 26, a key 36 is provided which clears the display to permit the operator to key the correct reading into the display so that it can be entered into the memory of the calculator by operation of either temperature key 30 or pressure altitude key 32. In the event the pressure altitude reading is negative, a key 38 is actuated to indicate that the sign is to be changed. Finally the keyboard 24 includes output keys 40 and 42 which, respectively, cause the display means 34 to show the calculations of military power available and maximum gross weight which may be hovered under the given environmental conditions and at an altitude out of ground effect.

FIG. 2 shows the basic circuit components 20C of calculator 20 which components are all known in the art and which may be found in the Texas Instruments calculator model TI-59 now available. It is noted that the present invention does not specifically relate to a new circuit component or combination of components, but rather to a novel calculator which is uniquely designed and preprogrammed to calculate a specific helicopter's hover performance capability, and therefore, the circuitry will be described only in general terms.

Keyboard 24 is operatively connected to a microprocessor 44 which is in circuit communication with a clock 46, a read only memory (ROM) 48, a random access memory (RAM) 50 and alphanumeric display 34.

Microprocessor 44 according to state-of-the-art technology is capable of receiving signals from keypad 24, coding the signals and sending the coded signals for storage in RAM 50. Upon initiation by keyboard 24, microprocessor 44 also is capable of performing calculations utilizing constants stored in ROM 48 and RAM 50 and instructions stored in ROM 48. Clock 46 acts to control the sequence of events in microprocessor 44.

Random access memory 50 according to state-of-the-art technology stores inputs from keypad 24, stores intermediate calculations from microprocessor 44 and supplies output data to display 34 upon initiation from keypad 24.

Read only memory 48, again according to state-of-the-art technology is capable of being preprogrammed with necessary constants and instructions which are used by microprocessor 44 during the calculating process.

Of course, it is well known that all of the components 44, 46, 48 and 50 may be fabricated of a very few integrated circuit chips so that calculator 20 may be of small size and weight.

Read only memory 48 is preprogrammed in a well known manner to store the following general constants (GC) which are utilized in the calculation of gross maximum hover weight for any helicopter:

GC1 = 0.0000068753
GC2 = 5.2561
GC3 = 273.15
GC4 = 288.15
GC5 = 0.00237688
GC6 = 550
GC7 = 1

Read only memory 48 also is preprogrammed with aircraft constants (AC) which are characteristic of a particular helicopter model; i.e., constants derived utilizing generalized performance data of the aircraft. For example, the aircraft constants utilized in calculating maximum hover weight for the AH-1G military helicopter may be preprogrammed as follows:

AC1 = −0.625
AC2 = 65.7
AC3 = 23.142857
AC4 = 6.3238879 × 10^{11}
AC5 = 0.74
AC6 = 1.483
AC7 = 847203717
AC8 = 49

Utilizing the above general constants and aircraft constants ROM 48 may be programmed to instruct microprocessor 44 to perform the following calculations:

CALC 1. Given pressure altitude (pa) find δ where:
$\delta = (GC7 - (GC1)(pa))^{GC2}$ CALC 2. Given outside air temperature (oat) find θ where:

$$\theta = \frac{oat + GC3}{GC4}$$

CALC 3. Calculate $\sqrt{\theta}$

CALC 4. Find available torque (t) where t=(AC1)(oat)+(AC2)δ$\sqrt{\theta}$

CALC 5. Calculate ρ where:

$$\rho = \frac{\delta}{\theta} (GC5)$$

CALC 6. Compare torque (t) to aircraft transmission limit (AC8) and change (t) to AC8 if t>AC8.

CALC 7. Calculate shaft horsepower (SHP) where:
SHP = t(AC3)

CALC 8. Calculate power coefficient (Cp) where:

$$Cp = \frac{(GC6)(SHP)}{\rho(AC7)}$$

CALC 9. Calculate weight coefficient (Cw) where:
Cw = (AC6)(Cp)^{AC5}

CALC 10. Calculate gross weight (G.W.) where:
G.W. = (Cw)ρ(AC7).

Operation of the calculator of the present invention is as follows: The operator first turns the power on by using switch 28 which causes clock 50 to generate a timing signal to microprocessor 44. Referring now particularly to FIG. 3 where there is shown a flow diagram of CALC 1 through CALC 10, the operator, by actuation of keys 26, enters the pressure altitude into a storage location in RAM 50 causing the reading to be shown on display means 34. If the operator entered the reading incorrectly, operation of clear key 36 causes it to be erased from memory and removed from display means 34. If the pressure altitude entry is correct, microprocessor 44 is responsive to actuation of input key 32 to read GC1, GC2 and GC7 from ROM 48 and the pressure altitude from RAM 50 to perform CALC 1 and the calculated value is stored at location STO 1 in RAM 50. Similarly, after the correct reading of outside air temperature is stored in RAM 50 and displayed correctly, actuation of input key 30 activates microprocessor 44 to read GC3 and GC4 from ROM 48 and the outside air temperature from RAM 50 and perform CALC 2, the answer to which is stored at locations STO 2 and STO 3 in RAM 50. Microprocessor 44 is next programmed to calculate the square root of the number in STO 2 and to read STO 1, AC1, STO 3, AC2 all to calculate CALC 4, the available torque which is stored at STO 4 in RAM 50.

Microprocessor 44 is also programmed to read GC5, STO 2 and STO 1 to perform CALC 5 and store the result at STO 5 in RAM 50.

In response to the operator depressing output key 40, CALC 6 is carried out wherein the number at STO 4 is compared to AC8 and if STO 4 is greater than AC8 then AC8 is displayed; otherwise STO 4 is displayed advising the operator of the torque available and this number is stored at STO 6.

Next, in response to actuation of output key 42 microprocessor 44 performs CALC 7 using STO 6 and AC3; CALC 8 using the last result in addition to GC6, AC4 and STO 5; CALC 9 using the last result in addition to AC6 and AC5; and CALC 10 using the last result in addition to STO 5 and AC7.

The result of CALC 10 reveals the maximum gross hover weight and the result is displayed on display means 34.

The result achieved appraises the operator of the maximum gross hover weight out of ground effect. It is also contemplated that other keys may be provided and further programming included to produce readouts of hover weights when the aircraft is hovering close to the ground. Also the calculator may be programmed to prompt the operator through messages on the display requesting the required inputs to perform the calculations.

Although the above-described calculator requires the operator to enter the outside air temperature and pressure altitude and further requires the operator to be aware of the weight of the loaded helicopter, the purview of the present invention extends to a fully automated system which gives the operator visual or audible warning that the craft is unable to hover at the present temperature and pressure altitude. More specifically, weight sensors attached to the landing gear could provide an electrical signal analogous to the overall gross weight to a comparator. Furthermore instruments measuring the temperature and pressure altitude could provide signals of those readings to the random access memory and the microprocessor could continually step through the program to calculate maximum hover weight with the output entered into the comparator. If the actual gross weight exceeded the calculated hover weight, the comparator would provide an output initiating an alarm indicating that the helicopter is unable to hover under the present conditions.

In view of the above, it will be seen that the main object of the invention is achieved along with other advantageous results.

As various changes could be made in the above constructions without departing from the spirit and the scope of the invention, it is intended that all matter contained in the above description or shown in the accompanying drawings shall be interpreted as illustrative and not in a limiting sense. Thus the calculator can be modified to provide a readout of useful load rather than gross weight in order that the pilot can eliminate the empty weight of the aircraft in determining his hover capability. The scope of the invention is defined solely by the language of the claims, which follow.

What is claimed is:

1. A device for aiding a helicopter operator in quickly determining the maximum hover weight of the helicopter comprising:

means for receiving a first input signal analogous to the air temperature outside of such helicopter, means for converting said first input signal into a first electronic signal;

means for storing said first electronic signal;

means for receiving a second input signal analogous to the pressure altitude outside of such helicopter;

means for converting said second input signal into a second electronic signal, means for storing said second electronic signal;

means for storing a plurality of other preprogrammed electronic signals analogous to the constants required and the calculations required in the computation of the available torque of such helicopter and the maximum hover weight of such helicopter;

first and second electrical switches;

first actuation means responsive to closing of said first switch for automatically converting said first and second electronic signals and certain ones of said other signals into a torque electronic signal analogous to the available torque of such helicopter;

display means for receiving said torque electronic signal and for producing an alphanumeric display readable by such operator analogous to said torque electronic signal;

second actuation means responsive to closing of said second switch for automatically converting said first and second electronic signals, certain ones of said other signals and said torque electronic signal into a hover electronic signal analogous to the maximum weight at which such helicopter can hover under ambient conditions; and means for receiving said hover electronic signal and for producing on said display means an alphanumeric display readable by such operator analogous to said hover electronic signal.

2. The device as set forth in claim 1 and further characterized by:

said means for storing said preprogrammed electronic signals includes a read only memory.

3. The device as set forth in claim 1 and further characterized by:

said means for storing said first and second electronic signals includes a random access memory.

4. The device as set forth in claim 1 and further characterized by:

said means for receiving said input signals includes a keyboard having an electrical switch corresponding to each of the numbers zero through nine and a decimal point;

said keyboard having an electrical switch for actuating said means for converting said first input signal to said first electronic signal; and said keyboard having a separate electronic switch for actuating said means for converting said second input signal to said second electronic signal.

5. The device as set forth in claim 4 and further characterized by:

said first electrical switch is actuated from said keyboard and said second electrical switch is actuated from said keyboard.

* * * * *